United States Patent
Hu (10) Patent No.: US 9,971,834 B2
(45) Date of Patent: May 15, 2018

(54) RECOMMENDATION SYSTEM AND METHOD FOR SEARCH INPUT

(71) Applicant: BEIJING QIHOO TECHNOLOGY COMPANY LIMITED, Beijing (CN)

(72) Inventor: Yi Hu, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 613 days.

(21) Appl. No.: 14/411,091

(22) PCT Filed: May 15, 2013

(86) PCT No.: PCT/CN2013/075639
§ 371 (c)(1),
(2) Date: Dec. 23, 2014

(87) PCT Pub. No.: WO2014/000517
PCT Pub. Date: Jan. 3, 2014

(65) Prior Publication Data
US 2015/0339384 A1   Nov. 26, 2015

(30) Foreign Application Priority Data

Jun. 26, 2012 (CN) .......................... 2012 1 0215120

(51) Int. Cl.
*G06F 17/30* (2006.01)
(52) U.S. Cl.
CPC .. *G06F 17/30864* (2013.01); *G06F 17/30625* (2013.01); *G06F 17/30669* (2013.01)
(58) Field of Classification Search
CPC ............................................... G06F 17/30864
See application file for complete search history.

(56) References Cited

U.S. PATENT DOCUMENTS

2008/0183673 A1* 7/2008 Gao .................. G06F 17/30864

FOREIGN PATENT DOCUMENTS

CN   101192108 A   6/2008
CN   101268463 A   9/2008
(Continued)

OTHER PUBLICATIONS

Naoaki Okazaki, "Static Double Array Trie (DASTrie)," Nov. 10, 2008, www.chokkan.org/software/dastrie/.*

Primary Examiner — Grace Park
(74) Attorney, Agent, or Firm — Baker & Hostetler LLP (57) ABSTRACT

The present invention discloses a recommendation system and method for search input. It relates to the field of search engine. The system comprises: a keyword acquisition unit configured to obtain a keyword according to a user input; a search tree storage unit configured to store Chinese characters in a tree data structure, wherein each data node in the tree stores one Chinese character and the address information of the recommended word(s) containing the Chinese character; a recommended word database configured to store the recommended words; an address acquisition unit configured to query the search tree storage unit according to the search keyword to acquire the address information of the recommended word(s); and a suggesting unit configured to query the recommended word database according to the address information to acquire the recommended word(s) and then suggest the recommended word(s) to the user.

15 Claims, 7 Drawing Sheets

Search tree storage unit    Recommended word database (56) References Cited

FOREIGN PATENT DOCUMENTS

| | | | |
|---|---|---|---|
| CN | 101458694 | A | 6/2009 |
| CN | 101727499 | A | 6/2010 |
| CN | 102768681 | A | 11/2012 |

\* cited by examiner

RECOMMENDATION SYSTEM AND METHOD FOR SEARCH INPUT

CROSS-REFERENCE TO RELATED APPLICATIONS

This application is the National Stage of International Application No. PCT/CN2013/075639, filed May 15, 2013, which claims the benefits of Chinese Patent Application No. 201210215120.4, filed Jun. 26, 2012, the disclosures of which are incorporated herein by reference in their entireties.

TECHNICAL FIELD

The present invention relates to the technical field of a search engine, especially to a recommendation system and method for search input.

BACKGROUND OF THE INVENTION

Suggest (search suggest) is a technique to provide a suggestion prompt according to a search word input by a user. In the Internet, the duty of a searcher is to help the user acquire information to be searched at a faster speed, with less operation and more accurately.

When inputting into a searching box, the user often needs to input many keywords and possibly switch between different input methods. Moreover, the keyword(s) input by the user is possibly subject to input mistakes such as homophones. Finally, the user may possibly not know what keyword(s) should be input to express his or her thoughts very appropriately. Suggest is used to improve the user experience of inputting keyword(s) into the input field. It can shorten user input, correct user input error. More importantly, it can recommend many keywords close to the ideas of the user.

In order to realize "suggest", it usually needs to go through two steps of phoneticizing process from Chinese character(s) to Pinyin and index searching process. Phoneticizing is to translate Chinese phrase(s) into the corresponding Chinese Pinyin. This process is difficult in processing polyphones, which is usually used only in the case of too few recommended words by index searching directly according to Chinese keyword(s). The index searching of Suggest is usually based on a hashmap (bases on the Map interface of the hashmap), where the performance of the searching process must be good because Suggest service will be celled many times during a user is inputting a keyword.

During the process of phoneticizing, the usual practice to process a polyphone is to enumerate its pronunciations. For example, the Chinese word "音乐" ("music" in English and "yin yue" in Pinyin)" will be translated into "yinyue" and "yinle" in Chinese Pinyin and Chinese word "乐视网 ("letv network" in English and "le shi wang" in Pinyin)" will be translated into "yueshiwang" and "leshiwang" in Chinese Pinyin. Such translation bases merely on the pronunciations of each single Chinese character without considering using situation. Thus, it may result in abundant Pinyin index and confusing the correct result. Also it is not beneficial to guide a user to recognize his or her misspelling.

During the course of getting the query string in Chinese from Pinyin, due to improper processing on polyphones, a searching noise may be induced. For example, if a user inputs Chinese Pinyin "yueshi" in Baidu search box whose real meaning is to search information about a lunar eclipse, however, Suggest feedbacks the recommended words including information clearly irrelevant such as Chinese word "乐视网" ("letv.com" in English and "le shi wang" in Pinyin) and Chinese word "钥匙" ("key" in English and "yaoshi" in Pinyin) though "lunar eclipse" is nearly submerged by the irrelevant information.

For an usual searching method, the larger the data set in a dictionary is, the larger the sub-trees necessary to traverse are. It will result in the increasing of duration consumed in searching as the increase of dataset size, which will affect the user experience.

SUMMARY OF THE INVENTION

In consideration of the problems as above, the present invention is proposed in order to provide a recommendation system and method for search input which will overcome the problems above, or solve or lighten at least part of the problems above.

According to one aspect of the present invention, a recommendation system for search input is provided, which comprises: a keyword acquisition unit, a search tree storage unit, a recommended word database, an address acquisition unit and a suggesting unit; wherein the keyword acquisition unit is configured to acquire search keyword(s) according to a user input; the search tree storage unit is configured to store Chinese character(s) in a tree data structure, wherein each data node in the tree stores one Chinese character and the address information of the recommended words containing the Chinese character; the recommended word database is configured to store the recommended word(s); the address acquisition unit is configured to query the search tree storage unit according to the search keyword(s) to obtain the address information of the recommended words; the suggesting unit is configured to query the recommended word database according to the address information to acquire the recommended word(s) to the user.

According to another aspect of the present invention, a recommendation method for search input is provided, which comprises the steps as: A: acquiring the search keyword(s) according to a user input; B: querying a search tree storage unit according to the search keyword(s) to acquire the address information of recommended word(s); wherein the search tree storage unit is configured to store Chinese character in a tree data structure, wherein each data node in the tree stores one Chinese character and the address information of the recommended word(s) containing the Chinese character; and C: querying the recommended word database according to the address information of the recommended word(s) to acquire the recommended word(s) and then suggesting the recommended word(s) to the user; wherein the recommended word database is configured to store the recommended word(s).

According to still another aspect of the present invention, a computer program is provided, which comprises computer readable codes. When the computer readable codes are run in a server, the server will execute the recommendation method for search input.

According to another aspect of the present invention, a computer readable medium is provided, which stores the computer program.

The beneficial effects of the present invention are:

According to the embodiments of the present invention, in the search tree storage unit, each data node is instructed to record the address information of all the recommended word(s) of characters contained in the node which hence improves the speed of searching the recommended word(s) and overcomes the problem as decreased searching speed due to the increased size of database; meanwhile, a combination of Pinyin is used to correspond to a Chinese phrase in the recommended word database and the polyphonic word database which hence overcomes the problem of searching noise caused by polyphones and improves the accuracy rate of recommendation.

The introductions above are only the overview of the technique solution according to the present invention. In order to understand more clearly the technical means according to the present invention and implement them according to the contents of the specification as well as to demonstrate the purposes and other purposes, the features and the advantages according to the present invention in more clear and understandable way, the following embodiments are described according to the present invention.

BRIEF DESCRIPTION OF THE DRAWINGS

Through reading the detailed descriptions of the preferred embodiments as follows, all other benefits and advantages will be clear for the skilled in the art. The drawings are only used to demonstrate the purposes of the preferred Embodiments rather than to be considered as any limit on the present invention. Also, a same symbol is used to indicate one same component throughout all the drawings. In the drawings.

DETAILED DESCRIPTIONS OF THE PREFERRED EMBODIMENTS

The present invention is further described as follows through combing the drawings and the Embodiments.

Figure 1:
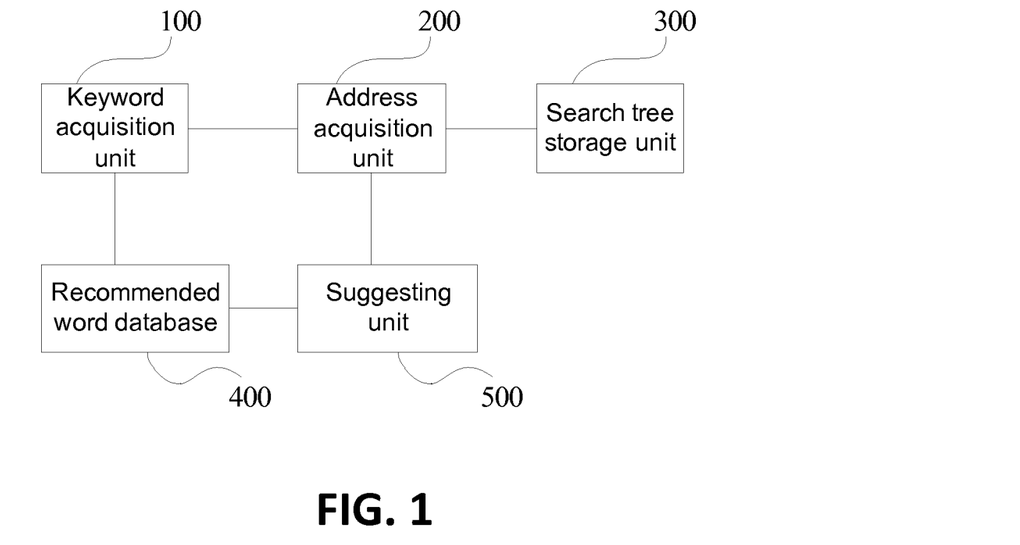
FIG. 1 is the schematic diagram of the module structure of the recommendation system for search input described in Embodiment 1 according to the present invention.

FIG. 1 is the schematic diagram of the module structure of the recommendation system for search input described in Embodiment 1 according to the present invention. As shown in FIG. 1, the mentioned system comprises: a keyword acquisition unit 100, an address acquisition unit 200, a search tree storage unit 300, a recommended word database 400 and a suggesting unit 500.

The keyword acquisition unit 100 is configured to acquire the search keyword(s) according to a user input. The user input is Pinyin input or Chinese character input.

If the user input is in the Pinyin input, the keyword acquisition unit 100 is configured to query the recommended word database 400 according to the input Pinyin, acquire guiding Chinese character(s) corresponding to the input Pinyin and use the guiding Chinese character(s) as search keyword(s). And the recommended word database 400 is configured to store the recommended word(s) and the Pinyin of the recommended word(s). Moreover, a combination of Pinyin is used to correspond to a Chinese phrase containing polyphone(s) in the recommended word database 400. The guiding Chinese character(s) is acquired from direct translation of the input Pinyin in the recommended word database 400.

The address acquisition unit 200 is configured to query the search tree storage unit 300 according to the guiding Chinese character(s) to acquire the address information of the guiding recommended word(s) with the guiding Chinese character(s) as a prefix. The search tree storage unit 300 employs a tree structure of Double Array Trie (hereinafter referred to as datrie). Each data node in the datrie tree records one Chinese character and the address information of the recommended word(s) containing the Chinese character. The datrie tree corresponds to the recommended word database 400 through the address information.

The suggesting unit 500 is configured to query the recommended word database 400 according to the address information of the guiding recommended word(s) to acquire it before suggesting it to the user.

If the user input is the Chinese character input, the keyword acquisition unit 100 will directly use the input Chinese character directly as a search keyword. The address acquisition unit 200 is configured to search the search tree storage unit 300 according to the input Chinese character to acquire the address information of the primary recommended word(s) with the Chinese character input as a prefix.

The suggesting unit 500 is configured to query the recommended word database 400 according to the address information of the primary recommended word(s) to acquire the corresponding primary recommended word(s) before suggesting it to the user.

Figure 2:
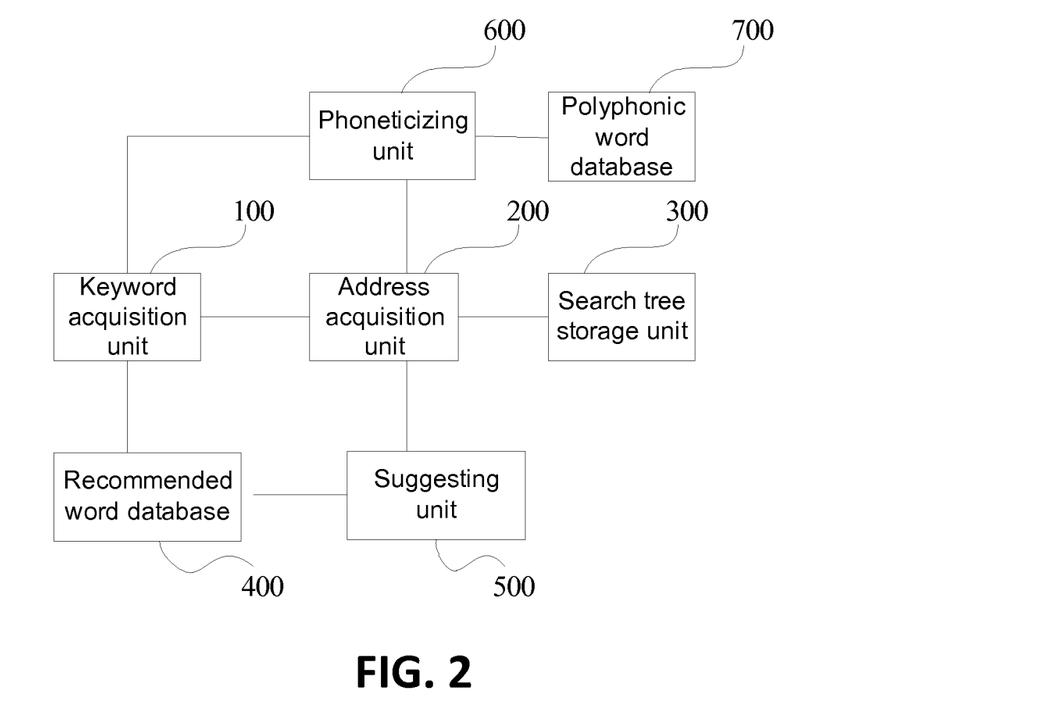
FIG. 2 is the schematic diagram of the module structure of the recommendation system for search input described in Embodiment 2 according to the present invention.

FIG. 2 is the schematic diagram of the module structure of the recommendation system for search input described in Embodiment 2 according to the present invention. As shown in FIG. 2, the system described in this Embodiment is basically the same as that in Embodiment 1. The difference between them lies only in that: the system of this Embodiment still comprises: a phoneticizing unit 600 and a polyphonic word database 700.

The phoneticizing unit 600 is configured to query the polyphonic word database 700 to acquire Pinyin mark when the number of the primary recommended word(s) is smaller than a preset threshold value, wherein the Pinyin mark corresponds to the Chinese word(s). The polyphonic word database 700 is configured to store Chinese character and Pinyin mark corresponding to the Chinese character, wherein a combination of Pinyin is used to correspond to Chinese phrase containing polyphones.

The keyword acquisition unit 100 is also configured to query again the recommended word database 400 according to the Pinyin mark to acquire the extended Chinese character(s) corresponding to the Pinyin mark. The extended Chinese character(s) is acquired from direct translation of the Pinyin mark by the recommended word database 400.

The address acquisition unit 200 is also configured to query the search tree storage unit 300 according to the extended Chinese character(s) to acquire the address information of the extended recommended words with the extended Chinese character(s) as a prefix.

The suggesting unit 500 is also configured to query the recommended word database 400 according to the address information of extended recommended words to acquire the extended recommended words, and then suggest it to a user.

Figure 3:
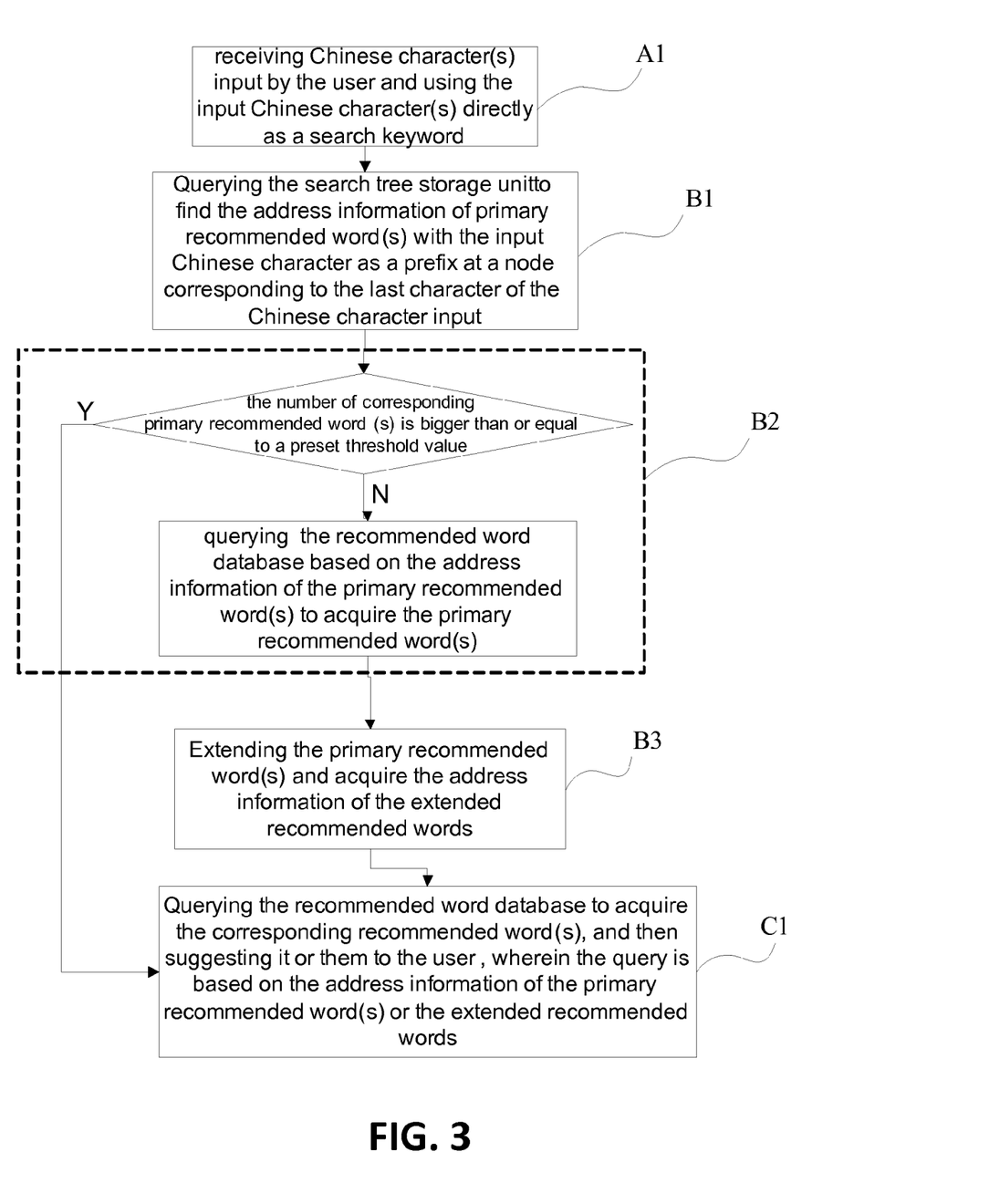
FIG. 3 is the process flow chart of the recommendation method for search input described in Embodiment 3 according to the present invention.

FIG. 3 is the process flow chart of the recommendation method for search input described in Embodiment 3 according to the present invention. As shown in FIG. 3, the method comprises steps of:

A1: receiving Chinese character(s) input by the user and using the input Chinese character(s) directly as a search keyword. In the Embodiment of the present invention, the user input is Chinese character input or Pinyin input. In practical use, the user input may also comprise English character(s) or other special character(s), etc. Nevertheless, the processing on such user input is not the emphasis of the present invention, so they are not described further here.

Figure 4:
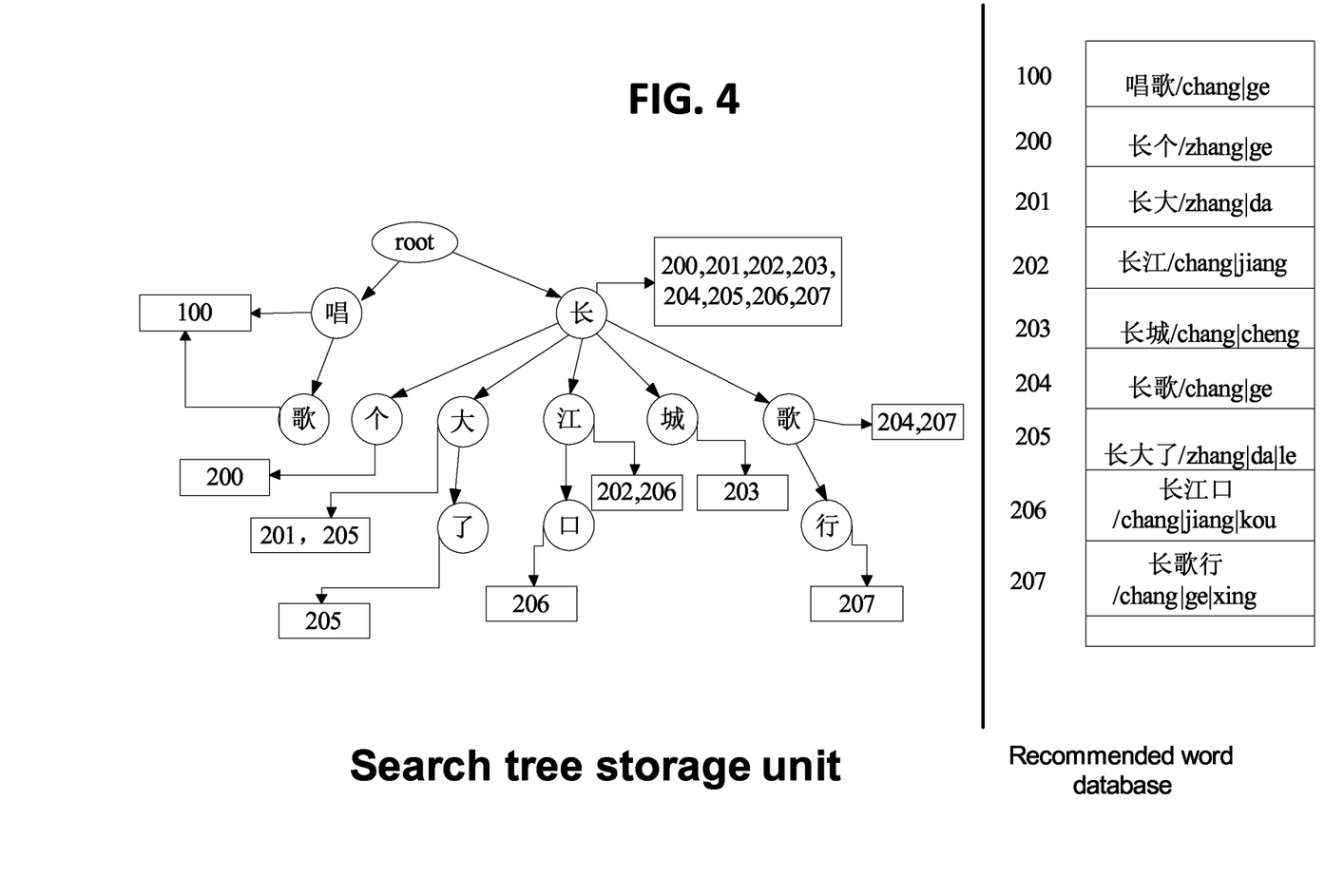
FIG. 4 is the structural diagram of the search tree storage unit and the recommended word database described in Embodiment 3 according to the present invention.

B1: Querying the search tree storage unit to find the address information of primary recommended word(s) with the input Chinese character as a prefix at a node corresponding to the last character of the Chinese character input. The search tree storage unit can employ a structure such as hashmap, trie tree and datrie tree. FIG. 4 is the structural diagram of the search tree storage unit and the recommended word database described in Embodiment 3 according to the present invention. As shown in FIG. 4, in this Embodiment, the search tree storage unit prefers to employ a structure of datrie tree. Each data node in the datrie tree (except the root node) stores one Chinese character and the address information of the recommended word(s) containing the Chinese character. The datrie tree corresponds to the recommended word database through the address information. For example, the node of Chinese character "长" ("grow" or "long" in English and "Zhang" or "Chang" in Pinyin) in FIG. 4 records the address information of all the recommended words containing "长". These recommended words includes: "Zhangge", "Zhangda", "Zhangdale", "Changjiang", "Changjiangkou", "Changcheng", "Changge", "Changgexing" in Chinese character Pinyin. Through such a design, when the last character of the search keyword is "长" in Chinese, after the node of the character "长" is found through query about the search tree storage unit, it is unnecessary to traverse the subtree(s) with "长" as the root node. All the recommended words containing "长" can be fed back directly. In this way, when the search tree storage unit is searched off line, some time is possibly consumed; then when the searching is carried out on line, the searching speed will be dramatically improved. Thus, it can realize one million searches per second and the performance will not drop as the increase of data size.

B2: Judging whether the number of corresponding primary recommended word(s) is bigger than or equal to a preset threshold value according to the address information of the primary recommended word(s). And if yes, executing Step C; otherwise, querying the recommended word database based on the address information of the primary recommended word(s) to acquire the primary recommended word(s) and executing Step B3. The preset threshold value can be set correspondingly according to practical application. For example, they can be set as 3, 4 or 5. In this Embodiment, the preset threshold value is set as 3. That is, when the number of the primary recommended word(s) is less than 3, it will be considered that the recommended word(s) are too few and an extension is necessary.

Figure 5:
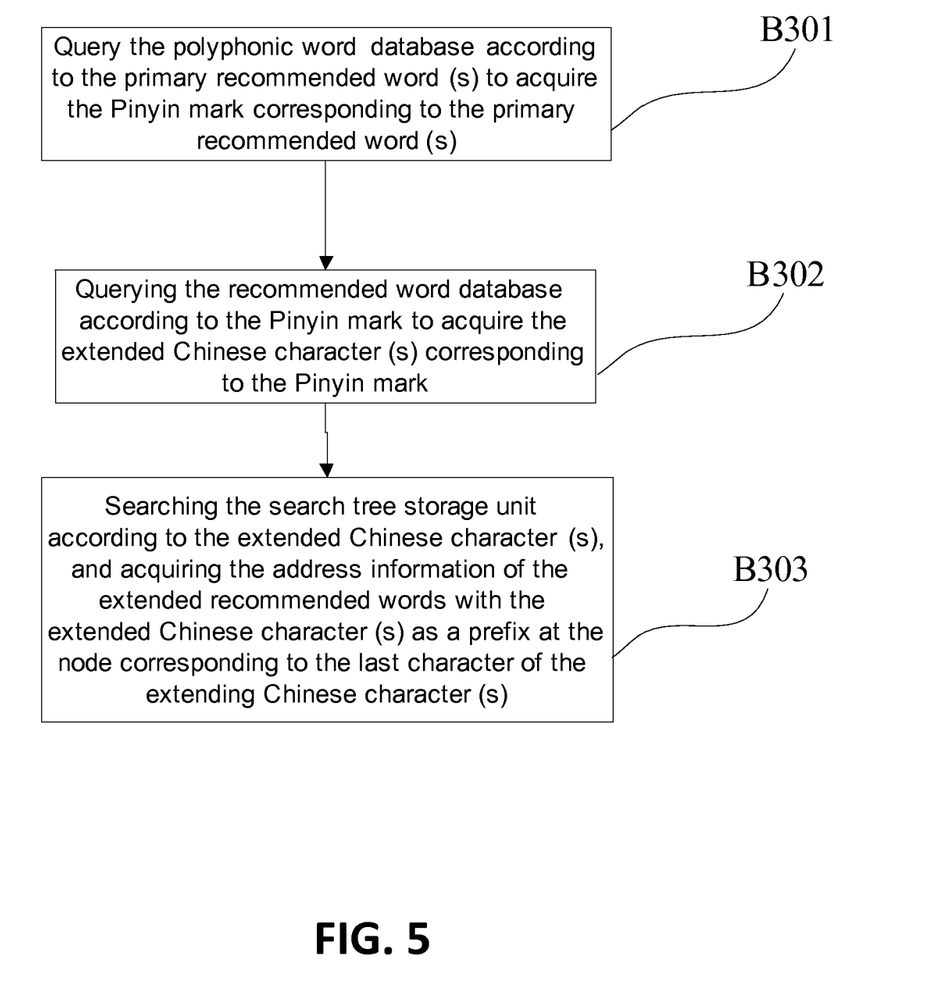
FIG. 5 is the flow chart of Step B3 described in Embodiment 3 according to the present invention.
Figure 6:
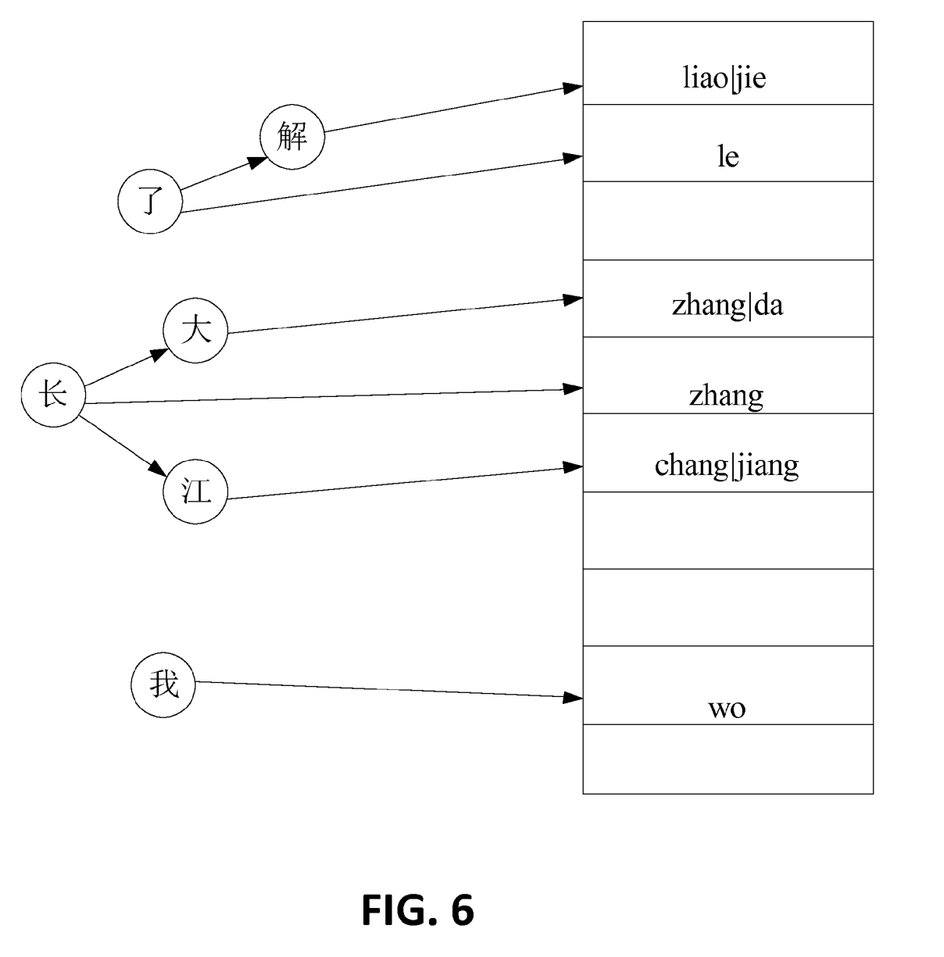
FIG. 6 is the structural diagram of the polyphonic word database described in Embodiment 3 according to the present invention.

B3: Extending the primary recommended word(s) and acquire the address information of the extended recommended words. FIG. 5 is the flow chart of Step B3 described in Embodiment 3 according to the present invention. As shown in FIG. 5, the mentioned Step 3 comprises the sub-steps specifically:

B301: A forward maximum matching algorithm is employed to query the polyphonic word database according to the primary recommended word(s) to acquire the Pinyin mark corresponding to the primary recommended word(s). FIG. 6 is the structural diagram of the polyphonic word database described in Embodiment 3 according to the present invention. As shown in FIG. 6, the polyphonic word database is configured to store Chinese characters and their Pinyin mark, wherein a combination of Pinyin is used to correspond to Chinese phrases containing polyphones; as for a single Chinese character, the polyphonic word database will feedback a default Pinyin which is commonly used, for example, the default Pinyin for Chinese character "了" ("le" and "liao" in Pinyin) is "le". Through such a design, if the primary recommended word(s) is "我长大了" ("I have grown up" in English and "wo zhang da le" in Pinyin), the acquired Pinyin phoneticization after searching the polyphonic word database will be "wo|zhang|da|le" rather than "wo|chang|da|le" or "wo|zhang|dai|le", so the translation noise due to polyphone is avoided.

During the practical use of the search engine by user, if the user searches with Chinese keyword(s), any error may occur due to homophones. For example, if a user wants to search information related to Chinese character "唱歌" ("sing" in English and "chang ge" in Pinyin), but a different Chinese word "长歌" ("long song" in English and "chang ge" in Pinyin) is input in error, then the user will hope the search engine can feedback the recommended word(s) related to "唱歌" rather than only those recommended word(s) like "长歌行" ("long song go" in English and "chang ge xing" in Pinyin), so the user can select from them directly without inputting repeatedly: however, the user prefers not to use the information related to "长个" (meaning like "grows tall" in English and "zhang ge" in Pinyin) being recommended. Thus, when phoneticizing Chinese word "长歌" ("long song" in English and "chang ge" in Pinyin), it must be marked strictly as "chang|ge" and can't be marked simultaneously to other word "zhang|ge" containing Chinese polyphonic character. However, it is obvious that the existing techniques cannot avoid the noise caused by the polyphones through phoneticizing with one letter as a unit. However, in the Embodiments according to the present invention, Chinese word(s) is phoneticized with a Chinese phrase as a unit and it avoids effectively the interference of such noise.

B302: Querying the recommended word database according to the Pinyin mark to acquire the extended Chinese character(s) corresponding to the Pinyin mark. As shown in FIG. 4, a combination of Pinyin is used to correspond to a Chinese phrase containing polyphone(s) in the recommended word database. For example, "长江" ("long river" in English and "chang jiang" in Pinyin) can be expressed as "chang|pang" in Chinese Pinyin and "长大" ("grow up" in English and "zhang da" in Pinyin) can be expressed as "zhang|da" in Chinese Pinyin; for a single Chinese character, the recommended word database will feedback a default Pinyin commonly used. For example, the default Pinyin of Chinese character "长" ("grow" or "long" in English, and "zhang" or "chang" in Pinyin) is "chang".

As shown in FIG. 4, if a Chinese keyword input by a user is "唱歌" ("sing" in English and "chang ge" in Pinyin), the primary recommended word(s) acquired are very few and the Pinyin mark obtained through the Step B103 is "chang|ge". If the recommended word database is queried again, the acquire extending Chinese characters will include "唱歌" ("sing" in English and "chang ge" in Pinyin) and "长歌" ("long song" in English and "chang ge" in Pinyin); but it will not include "长大" ("grows taller" in English and "zhang ge" in Pinyin). That is, the pronunciation of the acquired extending Chinese character(s) must be the same as that of the Chinese keyword input originally in the context of use (considering no tune) rather than only considering the polyphones for a single character. Thus, the problem of noise induced by polyphones in the recommended word database is further avoided.

B303: Searching the search tree storage unit according to the extended Chinese character(s), and acquiring the address information of the extended recommended words with the extended Chinese character(s) as a prefix at the node corresponding to the last character of the extending Chinese character(s).

If the extended Chinese character(s) "长歌" ("long song" in English and "chang ge" in Pinyin) is acquired from Step B302, then the new recommended words "长歌" ("long song" in English and "chang ge" in Pinyin), "长歌行" ("long song go" in English and "chang ge xing" in Pinyin) will be further extended. Therefore, the quantity of the recommended word(s) is increased simultaneously avoiding the noise of polyphones, it is convenient for user to select the corresponding recommended word(s).

C1: Querying the recommended word database to acquire the corresponding recommended word(s), and then suggesting it or them to the user, wherein the query is based on the address information of the primary recommended word(s) or the extended recommended words.

Figure 7:
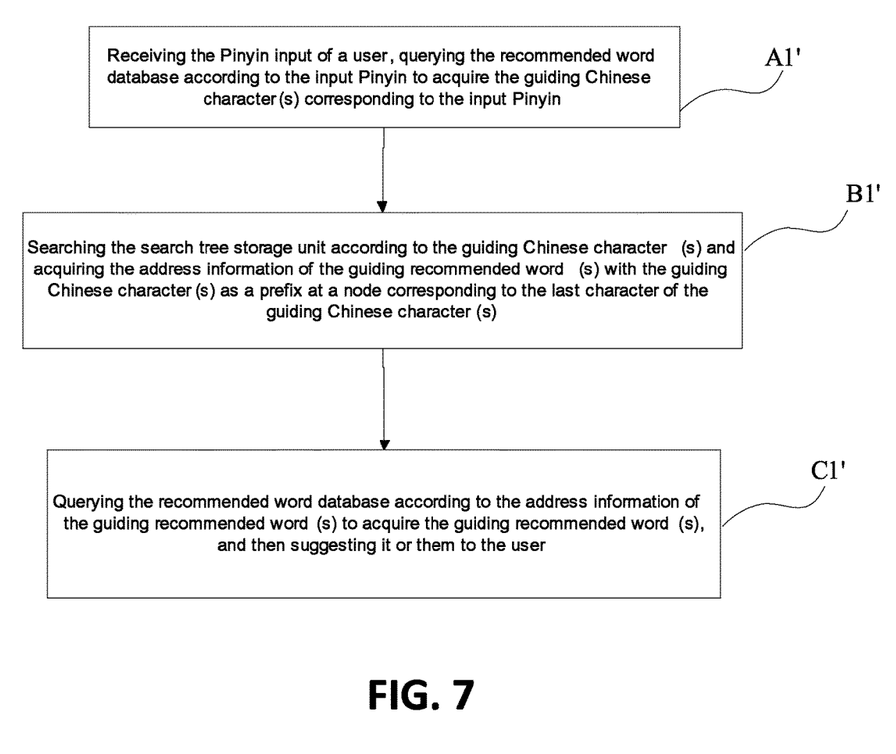
FIG. 7 is the process flow chart of the recommendation method for search input described in Embodiment 4 according to the present invention.

FIG. 7 is the process flow chart of the recommendation method for search input described in Embodiment 4 according to the present invention. The method described in this Embodiment is basically the same as that described in Embodiment 3. The only difference lies in that: the user input is Pinyin input. As shown in FIG. 7, the described method comprises:

A1': Receiving the Pinyin input of a user, querying the recommended word database according to the input Pinyin to acquire the guiding Chinese character(s) corresponding to the input Pinyin and using the guiding Chinese character(s) as a search keyword. For example, in FIG. 4, if the Pinyin input of user is "chang|ge", the obtained guiding Chinese character(s) will include "唱歌" ("sing" in English and "chang ge" in Pinyin) and "长歌" ("long song" in English and "chang ge" in Pinyin).

B1': Searching the search tree storage unit according to the guiding Chinese character(s) and acquiring the address information of the guiding recommended word(s) with the guiding Chinese character(s) as a prefix at a node corresponding to the last character of the guiding Chinese character(s).

C1': Querying the recommended word database according to the address information of the guiding recommended word(s) to acquire the guiding recommended word(s), and than suggesting it or them to the user.

It is easy for those skilled in the art to know that the user input may also include Chinese character Pinyin and Chinese character(s). So the whole user input can be divided firstly into Pinyin input part and Chinese input part before further processed respectively according to the method(s) as above. But they will not be further described here because they are not the emphasis of the present invention.

The recommendation system and the method for search input described in the Embodiments according to the present invention, during searching the tree storage unit, will instruct each data node to record the address information of all the recommended word(s) containing the node character, which hence improves the speed of searching the recommended word(s) and overcomes the problem of decreased searching speed caused by the increased size of database; meanwhile, a Pinyin set corresponds to a Chinese phrase in the recommended word database and the polyphonic word database which hence overcomes the problem of searching noise due to polyphones and improves the accuracy rate of recommendation.

The Embodiments of each component according to the present invention can be realized with hardware or software module running in one or more processors or with the combination of both them. Those skilled in the art should understand that a micro processor or a digital signal processor (DSP) can be used in practice to realize partial or all the functions of partial or all the components in the recommender system used to search the input according to the Embodiments of the present invention. The present invention can also be realized as an equipment program or device program used to execute partial or all the methods described here (for example, a computer program and computer program product). Such programs to realize the present invention can be stored in a readable medium of computer or in a form of one or more signals. Such signals can be downloaded from internet website or provided on carrier signal or provided by any other means.

Figure 8:
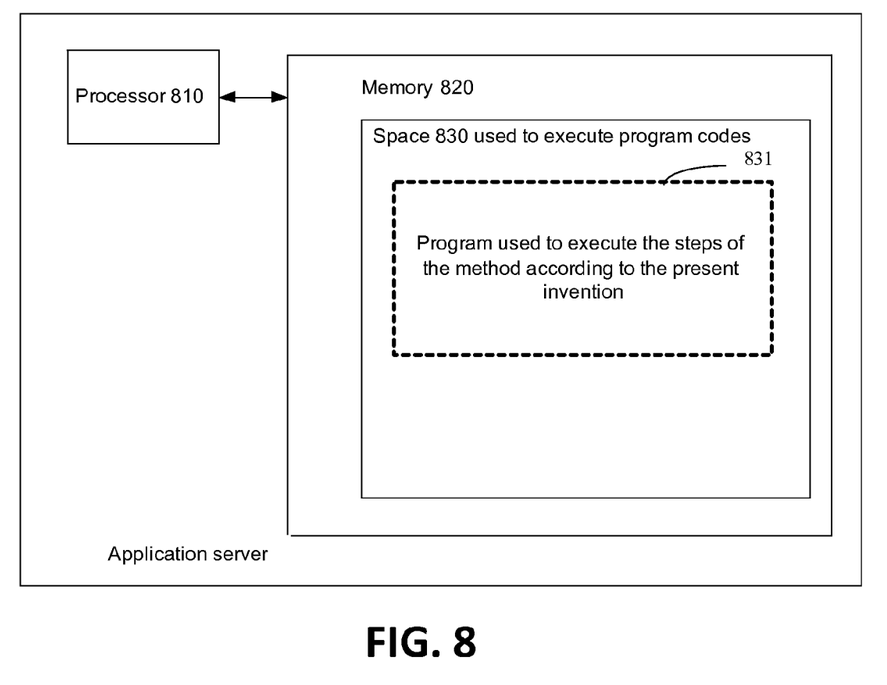
FIG. 8 is the block diagram showing schematically the server used to execute the method according to the present invention.
Figure 9:
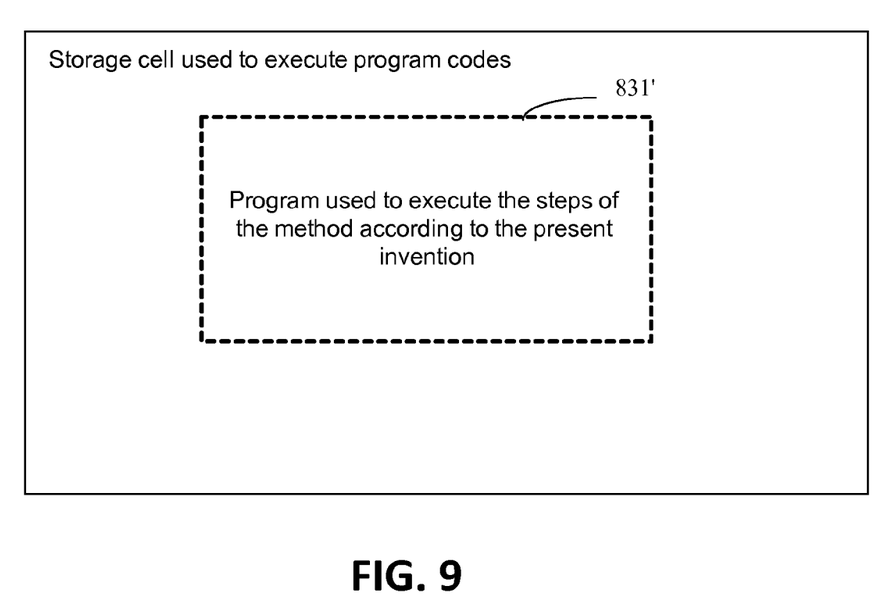
FIG. 9 shows schematically the storage cell used to hold or carry the program codes to realize the method(s) according to the present invention.

For example, FIG. 8 shows a server of the recommendation method for search input according to the present invention such as an application server. Traditionally, this server comprises a processor 810 and a computer program product or a computer readable medium in a form of memory 820. The memory 820 can be an electronic memory such as flash memory, EEPROM (electric erasable programmable read-only memory), EPROM, hard disc or ROM. The memory 820 has a storage space 830 for the program codes 831 used to execute any step of the methods above. For example, the storage space 830 for the program codes can contain various program codes 831 respectively used to realize each step of the methods above. These program codes can be read from or written into one or more computer program products. These computer program products include program code carriers such as hard disc, compact disc (CD), memory card or floppy. Such computer program product is usually the mobile or fixed storage cell as shown in the reference drawing 9. Such storage cell can be built with the memory paragraph, memory space, etc arranged similarly as memory 820 in the server shown in FIG. 8. The program codes can be compressed by appropriate means. Generally, the storage cell comprises computer readable codes 831', that is, the codes readable by the processor such as 810. If these codes are run by a server, each step of the method described as above can be executed by the server.

The "one Embodiment", "Embodiments" or "one or more Embodiments" mentioned in the present invention means that the specific features, structures or performances described in combination with the Embodiment(s) are included in at least one Embodiment. In addition, please note that the example indicated by the word "in one Embodiment" here may not mean one same Embodiment.

In the specification provided here, a large amount of details is described. Nevertheless, it can be understood that the Embodiments according to the present invention can be put into practice without these specific details. In some examples, the methods, structures and technologies that are generally known are not described in detail in order not to confuse the understanding on the specification.

It should be noted that the Embodiments described as above shall demonstrate the present invention rather than impose any limit on the present invention. Those skilled in the art can design other substitute Embodiment without going beyond the scope of the Claims attached. In the Claims, any reference symbol between the brackets shall not be interpreted as any limit on the Claims. The word "comprise" shall not exclude any component or step not listed in the Claims. The word "one" listed before any component shall not exclude the possibility of existence of many such components. The present invention can be realized with hardware comprising several different components or elements, or a computer by means of appropriate programming. In the Claims of unit listing more than one device, several among such devices can be specifically realized with one same hardware. The words "first", "second" or "third", etc are used not to express a order. These words can be interpreted as names.

Moreover, it should also be noted that the wording used in the specification is selected mainly for the purpose of readability and instruction rather than explaining or limiting the subjects of the present invention. Thus, many changes or modifications are obvious for those skilled in the art provided that they do not go beyond the scope and the spirit of the Claims attached. As for the scope of the present invention, the disclosure by the present invention is descriptive and not restrictive. The scope of the present invention shall be limited by the Claims attached.

The invention claimed is:

1. A system for recommending search input, comprising:
a processor; and
a memory communicatively coupled to the processor and storing instructions that upon execution by the processor cause the system to:
obtain search keyword(s) according to a user input;
query a search tree storage unit according to the search keyword(s) to obtain address information of recommended word(s), wherein the search tree storage unit is configured to store Chinese characters in a tree data structure, each data node in the tree data structure stores one Chinese character and address information of recommended word(s) containing the Chinese character;
query a recommended word database according to the address information to acquire the recommended word(s) and then suggest the recommended word(s) to the user, wherein the recommended word database is configured to store recommended words;
wherein the user input is Pinyin input or Chinese character(s) input;
wherein when the user input is the Chinese character(s) input, the instructions that upon execution by the processor cause the system to obtain search keyword(s) according to a user input further comprise instructions that upon execution by the processor cause the system to:
receive Chinese character(s) input by the user and use the input Chinese character(s) directly as a search keyword;
the instructions that upon execution by the processor cause the system to query a search tree storage unit according to the search keyword(s) to obtain address information of recommended word(s) further comprise instructions that upon execution by the processor cause the system to:
query the search tree storage unit to find address information of primary recommended word(s) with the input Chinese character(s) as a prefix at a node corresponding to the last character of the input Chinese character(s);
judge whether the number of corresponding primary recommended word(s) is bigger than or equal to a preset threshold value according to the address information of the primary recommended word(s); and if yes, executing the operation of querying a recommended word database according to the address information of the recommended word(s) to acquire the recommended word(s) and then suggesting the recommended word(s) to the user; otherwise, querying the recommended word database based on the address information of the primary recommended word(s) to acquire the primary recommended word(s) and the memory further stores instructions that upon execution by the processor cause the system to:
extend the primary recommended word(s) to acquire address information of the extended recommended word(s).

2. The system according to claim 1, wherein the recommended word database also stores Pinyin corresponding to the recommended word(s); and wherein the memory further storing instructions that upon execution by the processor cause the system to: query the recommended word database according to the input Pinyin to acquire guiding Chinese character(s) corresponding to the input Pinyin and use the guiding Chinese character(s) as a search keyword; or use directly the input Chinese character as a search keyword.

3. The system according to claim 2, wherein the memory further storing instructions that upon execution by the processor cause the system to:
query the search tree storage unit according to the guiding Chinese character(s) to acquire the address information of the guiding recommended word(s) with the guiding Chinese character(s) as a prefix; query the recommended word database according to the address information of the guiding recommended word(s) to acquire corresponding recommended word(s) and then suggest the recommended word(s) to the user.

4. The system according to claim 3, wherein the system also comprises:
a polyphonic word database and a phoneticizing unit; and wherein the memory further storing instructions that upon execution by the processor cause the system to:
store Chinese character(s) and a marked Pinyin corresponding to the Chinese character(s);
query the polyphonic word database to acquire the marked Pinyin corresponding to the input Chinese character when the number of the primary recommended word(s) is less than a preset threshold value;
query again the recommended word database according to the Pinyin mark to acquire extended Chinese character(s) corresponding to the Pinyin mark;
query the search tree storage unit according to the extended Chinese character(s) to acquire address information of extended recommended word(s) with the extended Chinese character(s) as a prefix; and
query the recommended word database according to the address information of the mentioned extended recommended word(s) to acquire the extended recommended word(s) and then suggest the extended recommended word(s) to a user.

5. The system according to claim 4, wherein a combination of Pinyin is used to correspond to Chinese phrases containing polyphone in the polyphonic word database.

6. The system according to claim 1, wherein a combination of Pinyin is used to correspond to Chinese phrases containing polyphone in the recommended word database.

7. The system according to claim 1, wherein the search tree storage unit employs a tree structure of Double Array Trie to store Chinese character(s).

8. A recommendation method for search input, comprising:
- A: acquiring a search keyword according to a user input;
- B: querying a search tree storage unit according to the search keyword to acquire address information of recommended word(s); wherein the search tree storage unit is configured to store Chinese characters in a tree data structure, wherein each node in the tree stores one Chinese character and the address information of the recommended word(s) containing the Chinese character;
- C: querying a recommended word database according to the address information of the recommended word(s) to acquire the recommended word(s) and then suggesting the recommended word(s) to the user, wherein the recommended word database is configured to store the recommended word(s);

wherein the user input is Pinyin input or Chinese character(s) input;

wherein when the user input is the Chinese character(s) input, the step A further comprises:
- A1: receiving Chinese character(s) input by the user and using the input Chinese character(s) directly as a search keyword;

the step B further comprises:
- B1: querying the search tree storage unit to find address information of primary recommended word(s) with the input Chinese character(s) as a prefix at a node corresponding to the last character of the input Chinese character(s);

wherein, after the step B1, the method also comprises:
- B2: judging whether the number of corresponding primary recommended word(s) is bigger than or equal to a preset threshold value according to the address information of the primary recommended word(s); and if yes, executing the step C; otherwise, querying the recommended word database based on the address information of the primary recommended word(s) to acquire the primary recommended word(s) and executing a step B3;
- B3: extending the primary recommended word(s) to acquire address information of the extended recommended word(s).

9. The method according to claim 8, wherein the step B3 specifically comprises:
- B301: querying a polyphonic word database according to the primary recommended word(s) to acquire a Pinyin mark corresponding to the primary recommended word(s);
- B302: querying the recommended word database according to the Pinyin mark to acquire the extended Chinese character(s) corresponding to the Pinyin mark; and
- B303: querying the search tree storage unit according to the extended Chinese character(s) to acquire the address information of the extended recommended word(s) with the extended Chinese character(s) as a prefix at a node corresponding to the last character of the extended Chinese character(s).

10. The method according to claim 9, wherein, in the step B301, a forward maximum matching algorithm is employed to query the polyphonic word database to acquire the Pinyin mark corresponding to the primary recommended word(s).

11. The method according to claim 8, wherein, when the user input is the Pinyin input, the step A specifically comprises:
- A1': receiving the Pinyin input by the user, querying the recommended word database according to input Pinyin to acquire guiding Chinese character(s) corresponding to the input Pinyin and using the guiding Chinese character(s) as a search keyword.

12. The method according to claim 11, wherein the step B specifically comprises:
- B1': querying the search tree storage unit according to the guiding Chinese character(s) and acquiring address information of the guiding recommended word(s) with the guiding Chinese character(s) as a prefix at a node corresponding to the last character of the guiding Chinese character(s).

13. The method according to claim 8, wherein a combination of Pinyin is used to correspond to Chinese phrases containing polyphone in the recommended word database.

14. The method according to claim 8, wherein the search tree storage unit employs a tree structure of Double Array Trie to store Chinese character(s).

15. A non-transitory computer readable medium having instructions stored thereon that, when executed by at least one processor, cause the at least one processor to perform recommendation operations for search input comprising:
- A: acquiring a search keyword according to a user input;
- B: querying a search tree storage unit according to the search keyword to acquire address information of recommended word(s); wherein the search tree storage unit is configured to store Chinese characters in a tree data structure, wherein each node in the tree stores one Chinese character and the address information of the recommended word(s) containing the Chinese character;
- C: querying a recommended word database according to the address information of the recommended word(s) to acquire the recommended word(s) and then suggesting the recommended word(s) to the user; wherein the recommended word database is configured to store the recommended word(s);

wherein the user input is Pinyin input or Chinese character(s) input;

wherein when the user input is the Chinese character(s) input, the operation A further comprises:
- A1: receiving Chinese character(s) input by the user and using the input Chinese character(s) directly as a search keyword;

the operation B further comprises:
- B1: querying the search tree storage unit to find address information of primary recommended word(s) with the input Chinese character(s) as a prefix at a node corresponding to the last character of the input Chinese character(s),
- B2: judging whether the number of corresponding primary recommended word(s) is bigger than or equal to a preset threshold value according to the address information of the primary recommended word(s); and if yes, executing the operation C; otherwise, querying the recommended word database based on the address information of the primary recommended word(s) to acquire the primary recommended word(s) and executing an operation B3, and B3: extending the primary recommended word(s) to acquire address information of the extended recommended word(s).

* * * * *